US011909825B2

(12) United States Patent
Bhattacharyya et al.

(10) Patent No.: US 11,909,825 B2
(45) Date of Patent: Feb. 20, 2024

(54) MULTI-MASTER HYBRID TELEROBOTICS SYSTEM WITH FEDERATED AVATAR CONTROL

(71) Applicant: Tata Consultancy Services Limited, Mumbai (IN)

(72) Inventors: Abhijan Bhattacharyya, Kolkata (IN); Ashis Sau, Kolkata (IN); Madhurima Ganguly, Kolkata (IN)

(73) Assignee: TATA CONULSTANCY SERVICES LIMITED, Mumbai (IN)

( * ) Notice: Subject to any disclaimer, the term of this patent is extended or adjusted under 35 U.S.C. 154(b) by 99 days.

(21) Appl. No.: 17/813,457

(22) Filed: Jul. 19, 2022

(65) Prior Publication Data

US 2023/0118704 A1 Apr. 20, 2023

(30) Foreign Application Priority Data

Oct. 19, 2021 (IN) ............................ 202121047312

(51) Int. Cl.

| | |
|---|---|
| ***H04L 67/141*** | (2022.01) |
| ***H04L 61/2589*** | (2022.01) |
| ***H04L 67/1042*** | (2022.01) |
| ***H04L 67/143*** | (2022.01) |

(52) U.S. Cl.

CPC ........ *H04L 67/141* (2013.01); *H04L 61/2589* (2013.01); *H04L 67/1042* (2013.01); *H04L 67/143* (2013.01)

(58) Field of Classification Search

CPC ............... H04L 67/141; H04L 61/2589; H04L 67/1042; H04L 67/143

See application file for complete search history.

(56) References Cited

U.S. PATENT DOCUMENTS 8,892,646 B2 11/2014 Chaturvedi et al.
9,049,262 B2 6/2015 Massover et al.
(Continued)

OTHER PUBLICATIONS

Lucas, Laurent et al., "USE Together, a WebRTC-based Solution for Multi-User Presence Desktop", International Conference on Cooperative Design, Visualization and Engineering, Date: Feb. 2018, Publisher: Springer, https://hal.univ-reims.fr/hal-01658337/file/main 30.pdf.

*Primary Examiner* — Thu V Nguyen
*Assistant Examiner* — Angela M Widhalm de Rodriguez
(74) *Attorney, Agent, or Firm* — Finnegan, Henderson, Farabow, Garrett & Dunner LLP

(57) ABSTRACT

The present disclosure addresses an issue of inherent delay in a cloud-centric architecture in a scenario where multiple remote users join a teleoperation session with a robot such that any one of the users may take exclusive control of the robot and remotely maneuver it as the avatar of a current master. A Web Real-Time Communication (WebRTC) based signaling protocol with a hybrid topology for a multi-user session is provided, wherein Audio-Visual (A/V) data streaming happens over a public cloud while each master creates an on-demand peer-to-peer (P2P) channel with the robot for a desired duration of maneuvering the robot that represents the avatar of the current master. Thus, low-latency delivery of control commands results in good user experience. The provided method and system may be applied to teleoperation sessions like telemedicine sessions.

18 Claims, 15 Drawing Sheets

(56) References Cited

U.S. PATENT DOCUMENTS

| | | | | |
|---|---|---|---|---|
| 2014/0149512 | A1* | 5/2014 | Leitch | H04L 67/1061 709/204 |
| 2014/0222930 | A1* | 8/2014 | Gangadharan | H04L 51/04 709/206 |
| 2016/0330252 | A1* | 11/2016 | Stahl | H04M 7/0066 |
| 2019/0201116 | A1* | 7/2019 | Shelton, IV | A61B 34/76 |
| 2021/0158955 | A1* | 5/2021 | Azizian | A61B 1/0004 |
| 2021/0241902 | A1 | 8/2021 | Wang et al. | |
| 2021/0304418 | A1* | 9/2021 | Soon-Shiong | G06F 16/70 |
| 2022/0057791 | A1* | 2/2022 | Saraf | G05D 1/0011 |

* cited by examiner

Robot_connection_status (at Broadcaster):

State_0:Robot_not_connected

State_1:Robot_connected_and_free

State_2:Robot_connected_and_busy

Actions:

a: Robot joined a session (Broadcast)

b: Robot leaves the session (Broadcast)

c: Master($i^{th}$) leaves the session (Broadcast)

d: Master($i^{th}$) requested to connect and got P2P access to Robot e: Master($i^{th}$) disconnects the P2P session to Robot

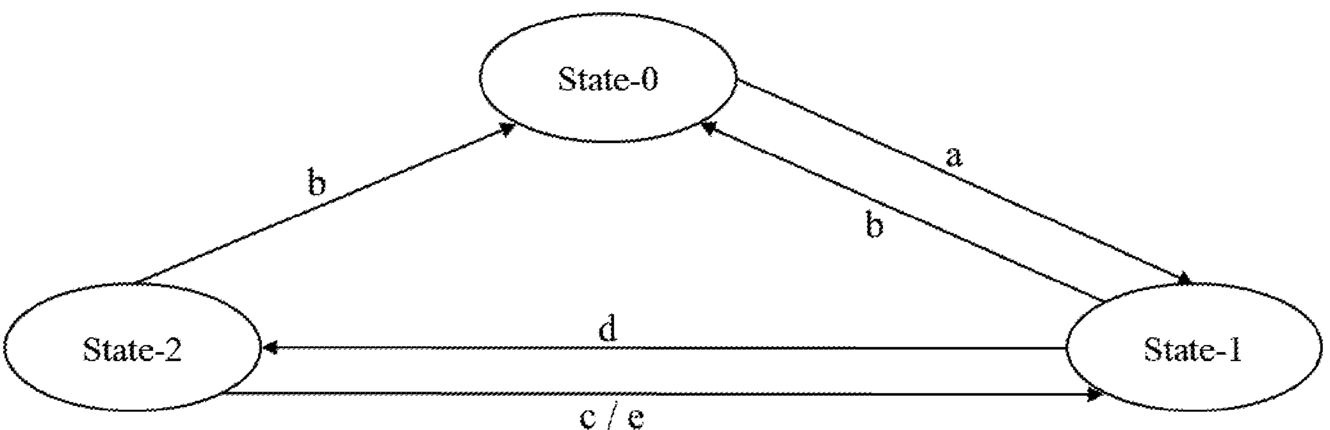

FIG.4

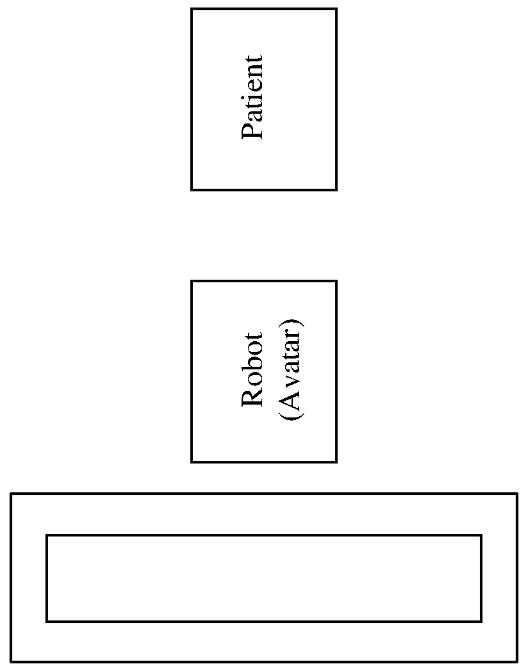
FIG.7B
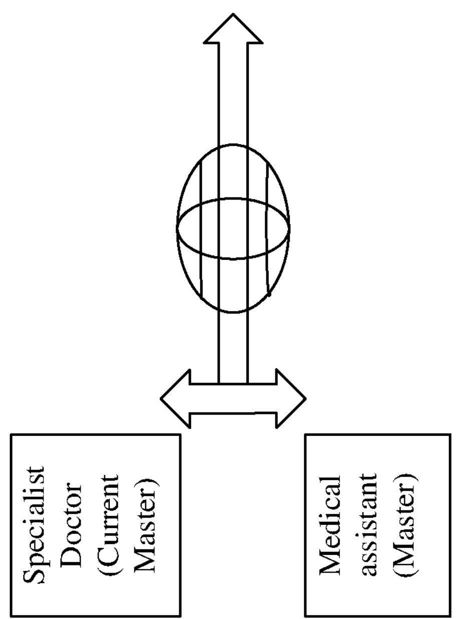

MULTI-MASTER HYBRID TELEROBOTICS SYSTEM WITH FEDERATED AVATAR CONTROL

PRIORITY CLAIM

This U.S. patent application claims priority under 35 U.S.C. § 119 to: India Application No. 202121047312, filed on 19 Oct. 2021. The entire contents of the aforementioned application are incorporated herein by reference.

TECHNICAL FIELD

The disclosure herein generally relates to telerobotics, and, more particularly, to a multi-master hybrid telerobotics system with federated avatar control.

BACKGROUND

Telerobotics based applications are in demand because of increase in global operations needing collaboration between human resources in different geographies. Furthermore, pandemic situations require human civilization to continue 'social' cooperation while maintaining physical 'distancing' even within a geography. Hence, unprecedented hindrances in traveling, physical assembling, etc. have reinforced a need for telerobotics based applications. In mobile telerobotics a human master interacts with a remote environment through a robot. The robot in the remote environment acts like an avatar of the human master. In a simplest form, the master establishes a real-time audio-video chat with the avatar over the Internet and based on the visual feedback from the avatar, the master sends control commands to remotely maneuver the avatar in real-time. In a Telepresence scenario, the maneuvering is limited to moving the robot around the remote environment as desired by the master.

The off-the-shelf telerobotics systems are mostly configured for one-to-one collaboration. A single master connects to an avatar remotely and maneuvers it while having audio-video exchange with the remote environment. In a multi-user scenario all the participating parties, including the robot, would require connecting through a conferencing server in cloud in a star-like topology. The cloud centricity causes delay in both transfer of control commands as well as in sharing the visual feedback which is critical for the end-user Quality of Experience (QoE) for telerobotics.

SUMMARY

Embodiments of the present disclosure present technological improvements as solutions to one or more of the above-mentioned technical problems recognized by the inventors in conventional systems.

In an aspect, there is provided a processor implemented method comprising the steps of: sending a peer-to-peer (P2P) connection request, from a master amongst a plurality of masters being user devices associated with a corresponding user, to a broadcaster via a signaling server, wherein the signaling server and the broadcaster are hosted on a public cloud and wherein the broadcaster is connected to a plurality of peers including (i) the plurality of masters and (ii) a robot in a star topology, each peer being identified by an associated peer-type and interact with each other via messaging; notifying (i) an identifier (ID) associated with the robot and the master, and (ii) a current state of the robot, by the broadcaster to the signaling server, wherein the broadcaster comprises a state-register for maintaining the current state of the robot and a media-manager for combining an Audio-Visual (A/V) data received from the plurality of peers via the public cloud; responding, by the broadcaster via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master; and if the current state of the robot is state_1, performing in parallel, by the signaling server, the steps of: passing the ID associated with the robot and the current state of the robot received from the broadcaster to the master; and requesting the robot to initiate a P2P connection with the master associated with the ID received from the broadcaster; sending, by the robot, a P2P connection offer to the master associated with the ID received, via the signaling server; accepting the P2P connection offer, by the master via the signaling server; establishing the P2P connection, on-demand between the master and the robot, upon exchanging of an Interactive Connectivity Establishment (ICE) candidate therebetween via the signaling server, wherein the robot represents an avatar of the master configured to control the robot via the P2P connection in a federated manner and the master is an active master of the teleoperation session; notifying that the P2P connection is established, by the active master and the robot to the signaling server and by the signaling server to the broadcaster; and broadcasting (i) the current state of the robot being state_2 and (ii) ID of the active master in P2P connection with the robot, to remaining masters amongst the plurality of masters, by the broadcaster, wherein, one or more hardware processors serve as the plurality of masters, the broadcaster, the signaling server and the robot.

In another aspect, there is provided a telerobotics system comprising: a memory storing instructions; one or more communication interfaces; and one or more hardware processors coupled to the memory via the one or more communication interfaces, wherein the one or more hardware processors serving as a plurality of masters being user devices associated with a corresponding user, a broadcaster, a signaling server, and a robot are configured by the instructions to: send a peer-to-peer (P2P) connection request, from a master amongst the plurality of masters, to the broadcaster via the signaling server, wherein the signaling server and the broadcaster are hosted on a public cloud and wherein the broadcaster is connected to a plurality of peers including (i) the plurality of masters and (ii) the robot in a star topology, each peer being identified by an associated peer-type; notify (i) an identifier (ID) associated with the robot and the master, and (ii) a current state of the robot, by the broadcaster to the signaling server, wherein the broadcaster comprises a state-register for maintaining the current state of the robot and a media-manager for combining an Audio-Visual (A/V) data received from the plurality of peers via the public cloud; respond, by the broadcaster via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master; and if the current state of the robot is state_1, perform in parallel, by the signaling server, the steps of: passing the ID associated with the robot and the current state of the robot received from the broadcaster to the master; and requesting the robot to initiate a P2P connection with the master associated with the ID received from the broadcaster; send, by the robot, a P2P connection offer to the master associated with the ID received, via the signaling server; accept the P2P connection offer, by the master via the signaling server; establish the P2P connection, on-demand between the master and the robot, upon exchanging of an Interactive Connectivity Establishment (ICE) candidate therebetween via the signaling server, wherein the robot represents an avatar of the master configured to control the robot via the P2P connection in a federated manner and the master is an active master of the teleoperation session; notify that the P2P connection is established, by the active master and the robot to the signaling server and by the signaling server to the broadcaster; and broadcast (i) the current state of the robot being state_2 and (ii) ID of the active master in P2P connection with the robot, to remaining masters amongst the plurality of masters, by the broadcaster.

In yet another aspect, there is provided a computer program product comprising a non-transitory computer readable medium having a computer readable program embodied therein, wherein the computer readable program, when executed on a computing device, causes the computing device to: send a peer-to-peer (P2P) connection request, from a master amongst a plurality of masters being user devices associated with a corresponding user, to a broadcaster via a signaling server, wherein the signaling server and the broadcaster are hosted on a public cloud and wherein the broadcaster is connected to a plurality of peers including (i) the plurality of masters and (ii) a robot in a star topology, each peer being identified by an associated peer-type and interact with each other via messaging; notify (i) an identifier (ID) associated with the robot and the master, and (ii) a current state of the robot, by the broadcaster to the signaling server, wherein the broadcaster comprises a state-register for maintaining the current state of the robot and a media-manager for combining an Audio-Visual (A/V) data received from the plurality of peers via the public cloud; responding, by the broadcaster via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master; and if the current state of the robot is state_1, performing in parallel, by the signaling server, the steps of: passing the ID associated with the robot and the current state of the robot received from the broadcaster to the master; and requesting the robot to initiate a P2P connection with the master associated with the ID received from the broadcaster; sending, by the robot, a P2P connection offer to the master associated with the ID received, via the signaling server; accepting the P2P connection offer, by the master via the signaling server; establishing the P2P connection, on-demand between the master and the robot, upon exchanging of an Interactive Connectivity Establishment (ICE) candidate therebetween via the signaling server, wherein the robot represents an avatar of the master configured to control the robot via the P2P connection in a federated manner and the master is an active master of the teleoperation session; notifying that the P2P connection is established, by the active master and the robot to the signaling server and by the signaling server to the broadcaster; and broadcasting (i) the current state of the robot being state_2 and (ii) ID of the active master in P2P connection with the robot, to remaining masters amongst the plurality of masters, by the broadcaster, wherein, one or more hardware processors serve as the plurality of masters, the broadcaster, the signaling server and the robot.

In accordance with an embodiment of the present disclosure, the one or more hardware processors are configured to establish the P2P connection via a Traversal Using Relays around NAT (TURN) server based on whether the active master and the avatar are behind a restrictive Network Address Translators (NAT).

In accordance with an embodiment of the present disclosure, the one or more hardware processors serving as the broadcaster are further configured to reject the P2P connection request, from the master, via the signaling server, if the current state of the robot is state_0 or state_2.

In accordance with an embodiment of the present disclosure, the one or more hardware processors are further configured to send a P2P disconnection request, from the active master, to the broadcaster via the signaling server; notify the avatar of the P2P disconnection request, by the broadcaster via the signaling server; and broadcast the current state of the robot being state_1, by the broadcaster via the signaling server to the active master that has relinquished control and the remaining masters amongst the plurality of masters.

In accordance with an embodiment of the present disclosure, the one or more hardware processors are configured to stream the Audio-Visual (A/V) data amongst the plurality of peers via the public cloud in the star topology, while control commands are delivered with low latency between the active master and the avatar via the established P2P connection on-demand, thereby providing a hybrid topology.

In accordance with an embodiment of the present disclosure, the messaging between the plurality of peers is in a JavaScript Object Notation (JSON) format with four parameters represented as:

```
{
  "connection-type": <>,
  "room-id": <>,
  "message-type": <>,
  "message": <>
}
```

In accordance with an embodiment of the present disclosure, the four parameters are characterized as:

(i) the "connection-type" is a Boolean, wherein 0 indicates a broadcast session and 1 indicates the P2P connection;

(ii) the "room-id" is a string value representing an identifier (ID) for the teleoperation session;

(iii) the "message-type" is a three-bit string, wherein
 000 represents request connection or disconnection,
 001 represents send connection request acceptance,
 010 represents initiate connection,
 011 represents send connection establishment status,
 100 represents send robot-connection-status,
 101 represents send offer,
 110 represents send answer, and
 111 represents send ICE candidate; and (iv) the "message" comprises messages specific to the "message-type".

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4 illustrates a state diagram representing various states of a robot, maintained by a broadcaster in accordance with some embodiments of the present disclosure.

FIG. 7A and FIG. 7B illustrate a practical telemedicine application of the multi-master telerobotics system of FIG. 1 and the computer implemented method of FIG. 3A through FIG. 3C, wherein medical staff collaborate with a robot to provide consultation to a patient, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 6A:
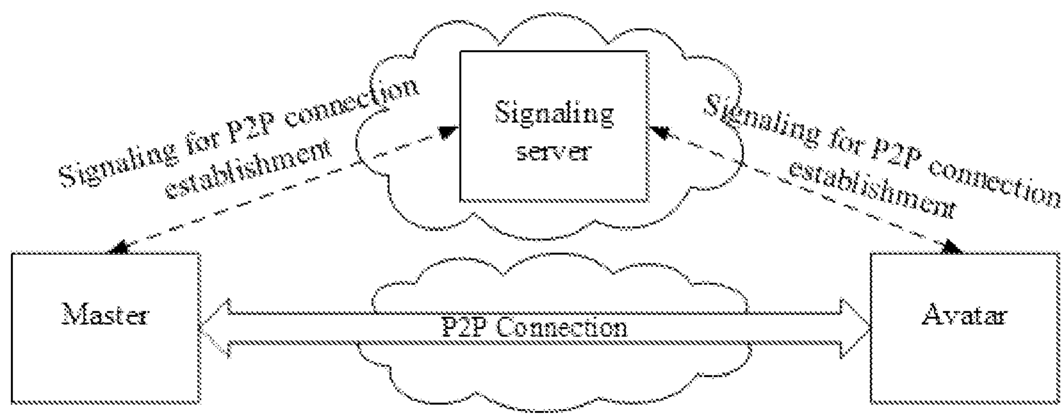
FIG. 6A and FIG. 6B illustrate Web Real-Time Communication (WebRTC) with direct P2P connection and WebRTC with P2P via a Traversal Using Relays around NAT (TURN) server respectively, in accordance with some embodiments of the present disclosure.
Figure 6B:
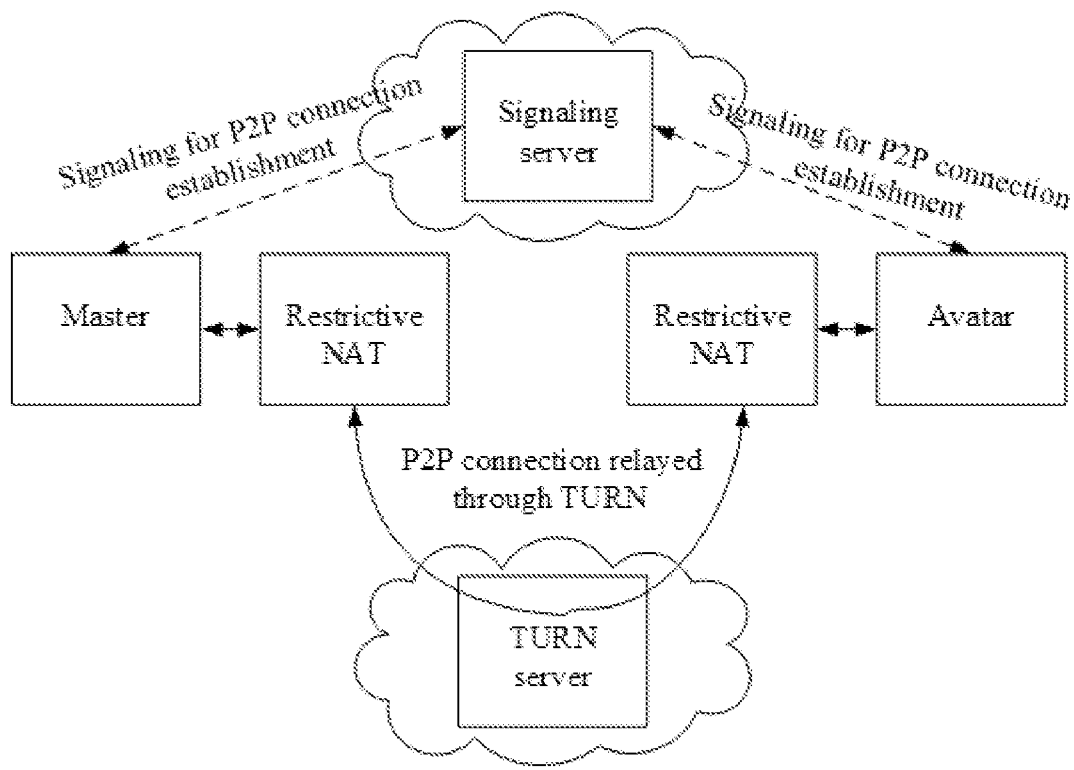

Traditional telerobotics systems are mostly configured for one-to-one collaboration between a single master and an avatar (robot) remotely. Web Real-Time Communication (WebRTC) is a technology for real-time multimedia applications and primarily designed to use the internet browser as a user interface (UI) for multi-media conferencing. Audio-Visual (A/V) data is exchanged over a media channel on Secure Real-time Transport Protocol (SRTP) and any other data is exchanged over a reliable data-channel on Stream Control Transport Protocol (SCTP). The WebRTC has an inherent capability to establish low-latency end-to-end (E2E) channel through peer-to-peer (P2P) connection between the browsers of the participating Master and Avatar (FIG. 6A). However, the P2P connection may have to pass through a Traversal Using Relays around NAT (TURN) server when a direct P2P connection is not possible for nodes behind restricted Network Address Translators (NATs) (FIG. 6B). Most telerobotics solutions work in a P2P setting with only one master connecting to the avatar. However, in a practical collaborative situation, it may be required that multiple human users need to connect to a robot simultaneously in a session to perform a composite task through the robot by taking control of the robot. In such a multi-user scenario, all participating users, including the robot, would require connecting through a conferencing server in cloud in a star-like topology. This breaks a true P2P paradigm. The cloud centricity causes delay in both transfer of control commands as well as in sharing a visual feedback which is critical for the end-user Quality of Experience (QoE) for telerobotics.

To address latency issues in conventional cloud centric multi-user telerobotics approaches, a hybrid architecture is provided for a multi-user telerobotics system comprising a broadcaster connected to each peer (users and the robot or the avatar) in the network and a signaling server. The architecture of the present disclosure enables a dynamic configuration with a hybrid topology where media is exchanged via a public cloud and control commands are transferred over the P2P connection, thereby reducing the latency in maneuvering the avatar.

While having a real-time multi-user Audio-Visual (A/V) conference, each user may need to perform a part of the task. Thus, each user needs to act as a master for a certain duration with exclusive access to the robot and the robot acts as the avatar of that particular user for the stipulated period. Once, the task is completed, a current master relinquishes the control. Another user may take control and elevate as a current master. However, irrespective of which user is the current master, all the users are able to continue participating in an A/V chat and receive visual feedback from the avatar as well as other users. The present disclosure thus provides federated control of the robot, wherein on-demand control of the robot by a master is enabled after the current master relinquishes control while peers (masters and the robot) continue to interact with each other via the A/V conference, unlike traditional systems where arbitrary control is typically provided.

In the context of the present disclosure, the expressions 'current master' and 'active master' may be used interchangeably. A teleoperation session is considered to be initiated when the peers connect to a telerobotics system. Although the description and claims hereinafter refers to a teleoperation session, it may be noted by those skilled in the art that the method and system of the present disclosure may be applied to a telepresence environment as well. Accordingly, in the context of the present disclosure, the expression 'teleoperation session' is defined to include a 'telepresence session' and may also be referred as a 'telerobotics session'. Further, 'users' in a teleoperation session including human users with their associated user devices may be interchangeably referred as 'masters'. Furthermore, in the context of the present disclosure, the robot may be a humanoid, a drone, an unmanned aerial vehicle (UAV), or any other machine capable of carrying out complex series of actions.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

Figure 1:
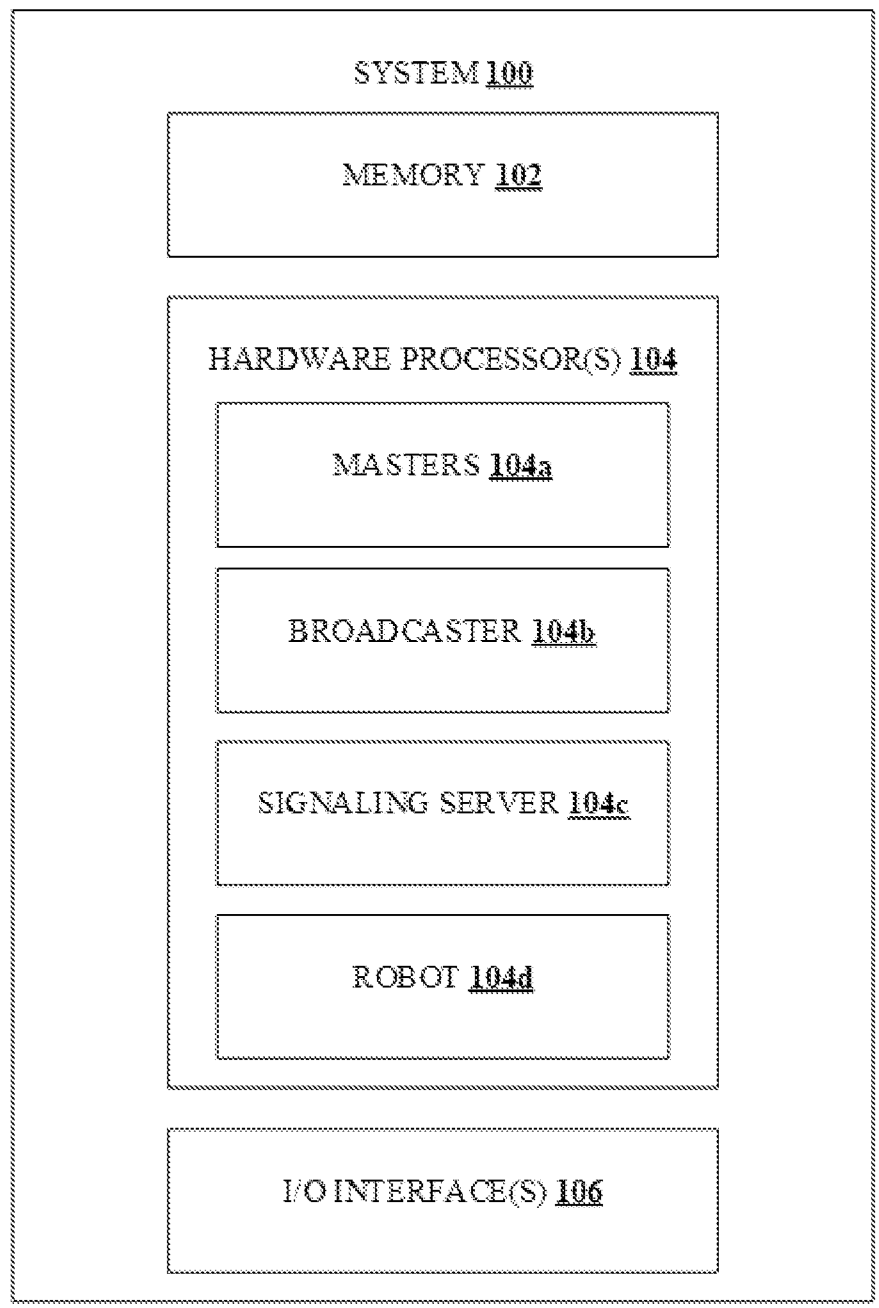
FIG. 1 illustrates an exemplary block diagram of a multi-master hybrid telerobotics system with federated avatar control, in accordance with some embodiments of the present disclosure.

FIG. 1 illustrates an exemplary block diagram of a multi-master hybrid telerobotics system 100 with federated avatar control, in accordance with some embodiments of the present disclosure. In an embodiment, the telerobotics system 100 includes one or more hardware processors 104, communication interface (s) or input/output (I/O) interface(s) 106, and one or more data storage devices or memory 102 operatively coupled to the one or more hardware processors 104. The one or more hardware processors 104 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the telerobotics system 100 can be implemented in a variety of computing systems, such as laptop computers, notebooks, hand-held devices, workstations, mainframe computers, servers, a network cloud and the like.

The communication interface (s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, one or more modules (104*a*-10*d* described later) of the telerobotics system 100 can be stored in the memory 102.

Figure 2:
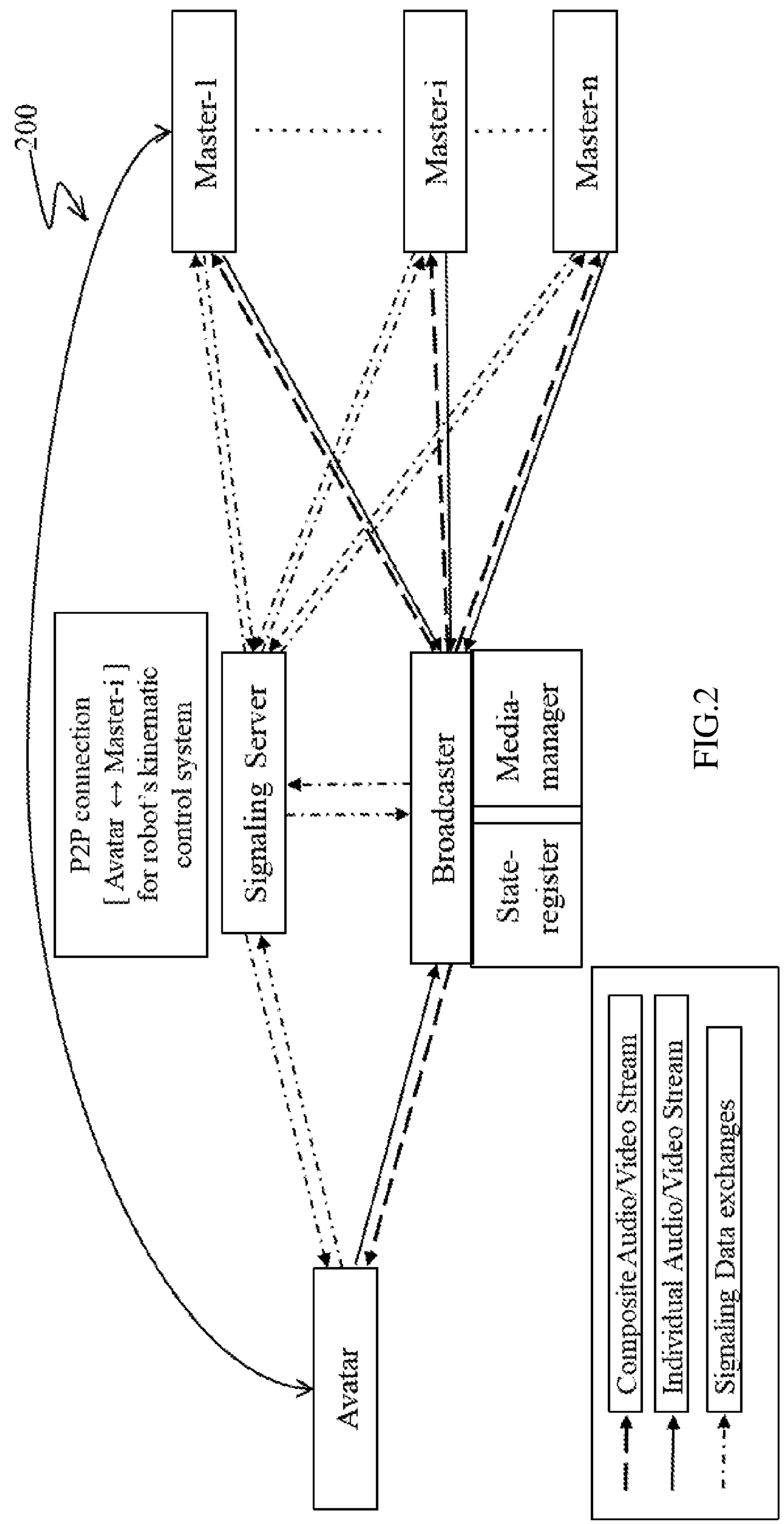
FIG. 2 illustrates an architecture of the multi-master telerobotics system of FIG. 1, in accordance with some embodiments of the present disclosure.

FIG. 2 illustrates an architecture 200 of the telerobotics system of FIG. 1, in accordance with some embodiments of the present disclosure. As illustrated in FIG. 2, in an embodiment, a multi-user connectivity is established through a special node called the broadcaster. The broadcaster maintains a separate P2P relationship with each human user nodes (Master-1 . . . Master-i . . . , Master-n) and the robot (Avatar). Thus a 'star' topology is formed. The broadcaster receives A/V feedback from all the individual nodes over the P2P connection and shares the composite A/V combining all the feeds from all the other users connected to the broadcaster over individual P2P channels. The broadcaster maintains the states of all peers in each P2P channel and a media-manager inside the broadcaster is responsible for combining the video in a customized manner for each peer. A state-register maintains the state for each peer's connection state, especially the state of the robot. The signaling server helps establish the peering of the broadcaster with each peer. The signaling server and the broadcaster both are in the public cloud. The users and the avatar may be behind different types of NATs or contain public Internet Protocols (IPs). The P2P connections may traverse through a TURN server or be direct depending on whether the respective peer is behind a restrictive NAT.

In an embodiment, the telerobotics system 100 includes the memory 102 operatively coupled to the one or more hardware processors 104 and is configured to store instructions configured for execution of steps of the method 300 by the one or more hardware processors 104. The steps of the method 300 will now be explained in detail with reference to the components of the telerobotics system 100 of FIG. 1 in line with the architecture illustrated in FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 3A:
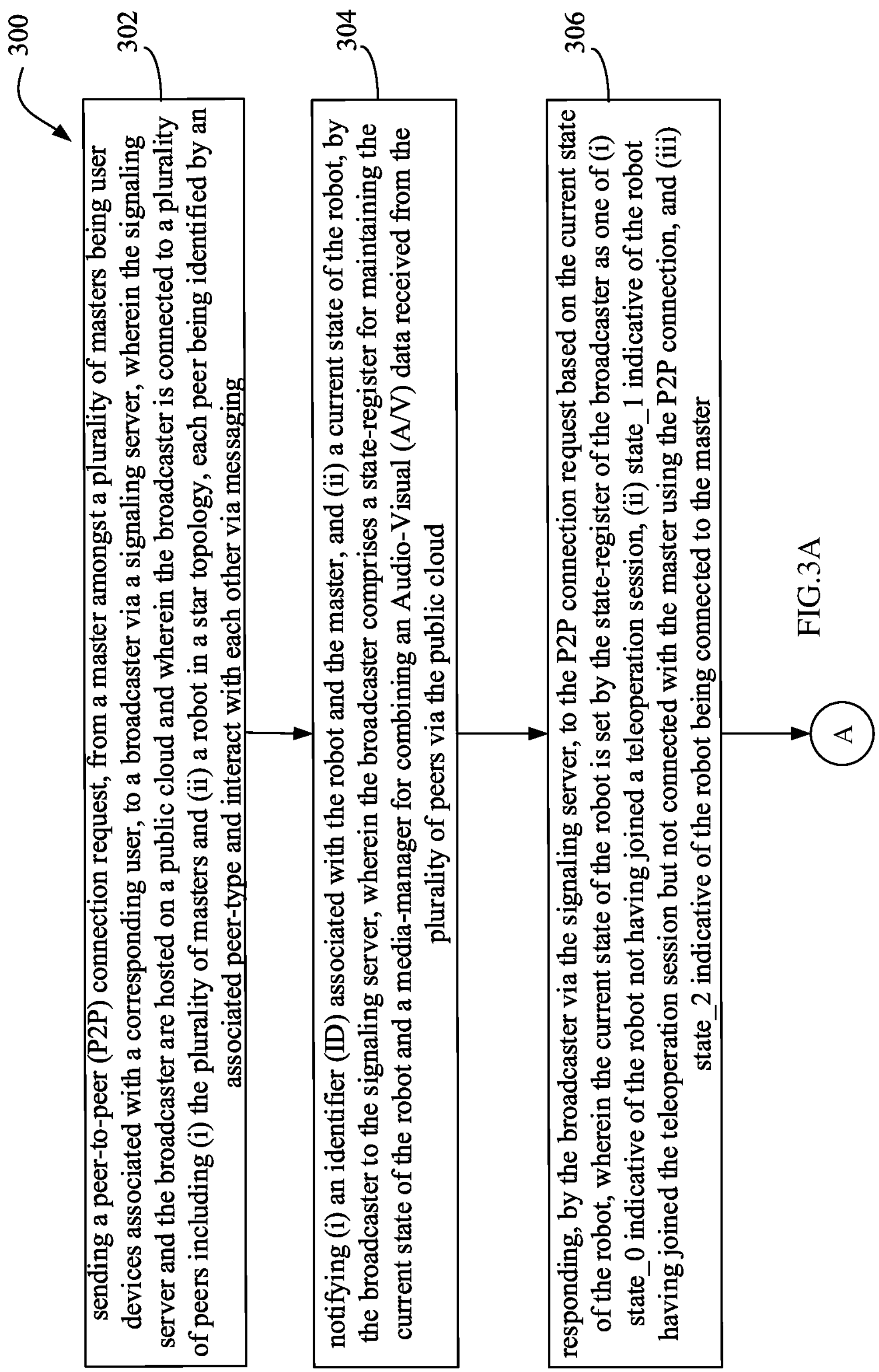
FIG. 3A through FIG. 3C illustrates an exemplary flow diagram of a computer implemented method for the multi-master hybrid telerobotics system of FIG. 1 with federated avatar control, in accordance with some embodiments of the present disclosure.
Figure 3B:
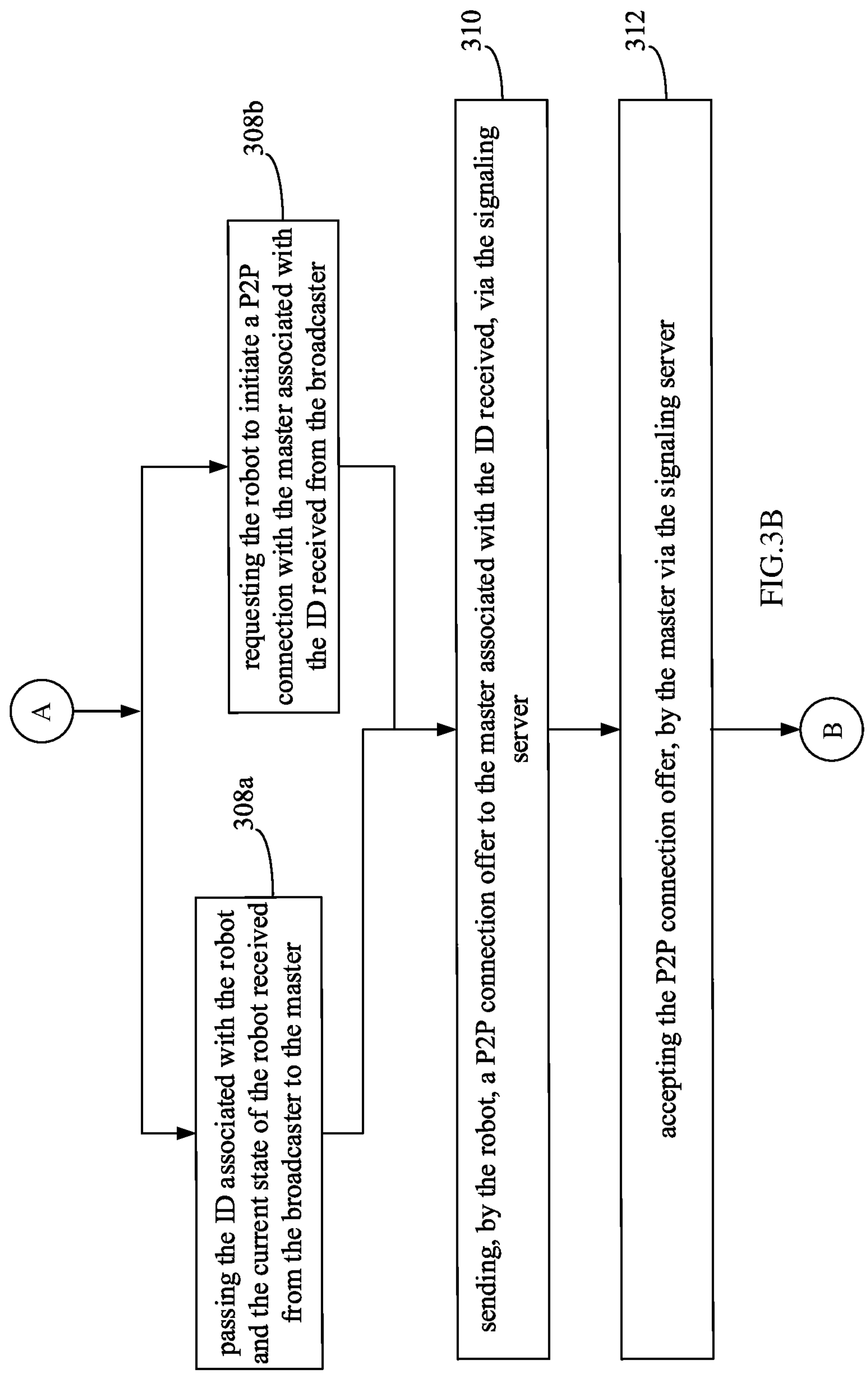
Figure 3C:
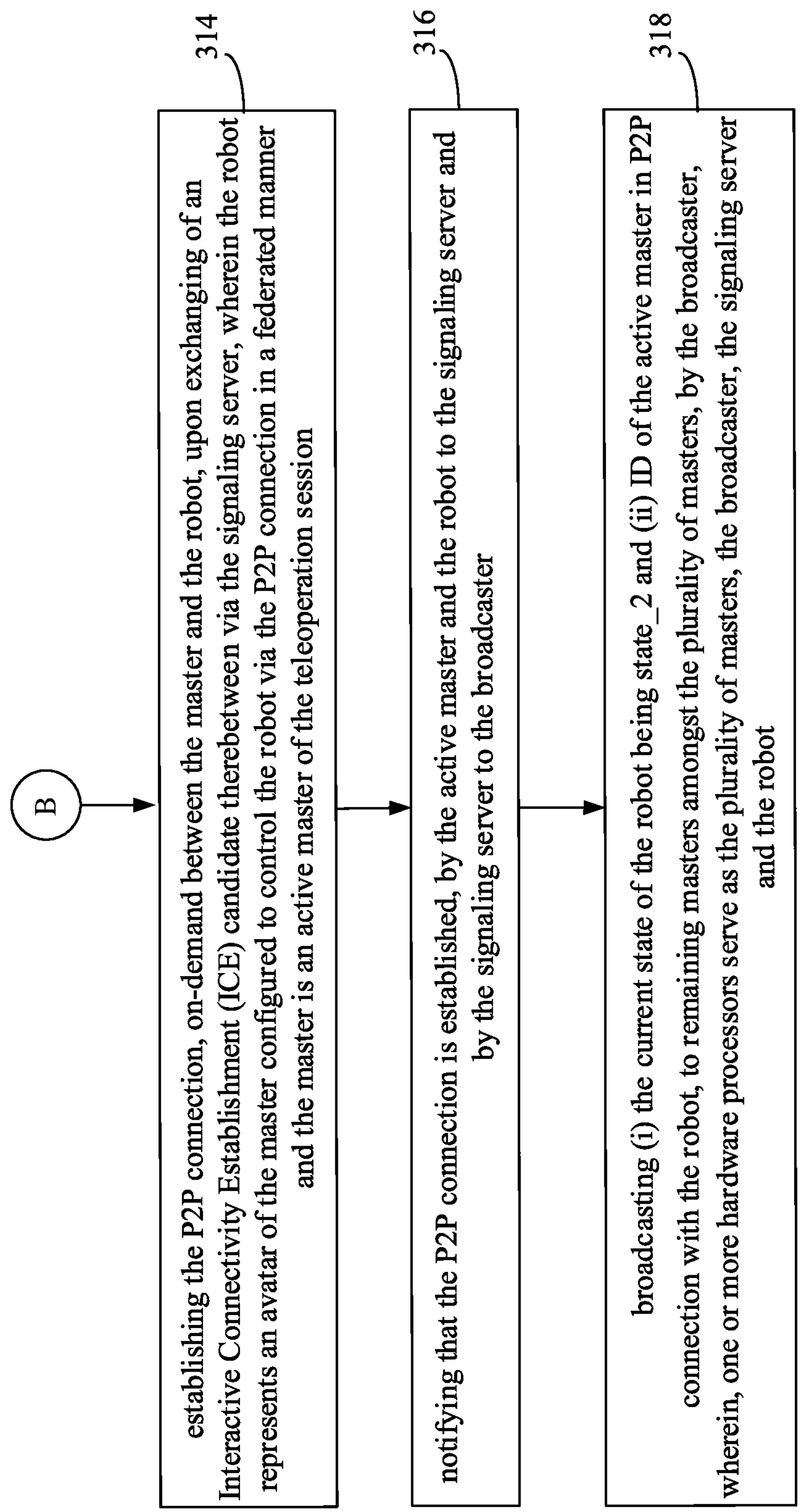

FIG. 3A through FIG. 3C illustrates an exemplary flow diagram of a computer implemented method 300 for the multi-master hybrid telerobotics system of FIG. 1 with federated avatar control, in accordance with some embodiments of the present disclosure, wherein the one or more hardware processors serve as a plurality of masters (referenced as 104*a* in FIG. 1) being user devices associated with a corresponding user, the broadcaster (referenced as 104*b* in FIG. 1), the signaling server (referenced as 104*c* in FIG. 1), and the robot (referenced as 104*d* in FIG. 1).

In an embodiment of the present disclosure, at step 302, a peer-to-peer (P2P) connection request is sent, from the master amongst a plurality of masters being user devices associated with a corresponding user, to a broadcaster via a signaling server, wherein the signaling server and the broadcaster are hosted on a public cloud and wherein the broadcaster is connected to a plurality of peers including (i) the plurality of masters and (ii) a robot in a star topology, each peer being identified by an associated peer-type and interact with each other via messaging. At step 304, (i) an identifier (ID) associated with the robot and the master, and (ii) a current state of the robot, are notified by the broadcaster to the signaling server, wherein the broadcaster comprises a state-register for maintaining the current state of the robot and a media-manager for combining an Audio-Visual (A/V) data received from the plurality of peers via the public cloud.

Further, at step 306, the broadcaster responds via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master. FIG. 4 illustrates a state diagram representing various states of the robot, maintained by the broadcaster in accordance with some embodiments of the present disclosure.

In an embodiment of the present disclosure, if the current state of the robot is state_1, the signaling server performs in parallel, the steps of passing the ID associated with the robot and the current state of the robot received from the broadcaster to the master at step 308*a*; and requesting the robot to initiate a P2P connection with the master associated with the ID received from the broadcaster, at step 308*b*. At step 310, the robot sends a P2P connection offer to the master associated with the ID received, via the signaling server after which the P2P connection offer is accepted by the master via the signaling server at step 312.

In an embodiment of the present disclosure, an on-demand P2P connection is established between the master and the robot, at step 314, upon exchanging of an Interactive Connectivity Establishment (ICE) candidate between the master and the server via the signaling server. The candidate represents information about network connection such as protocol and routing details in the WebRTC during connection establishment between two peers. Once the P2P connection is established, the robot represents an avatar of the connected master that is configured to control the robot via the P2P connection in a federated manner and the master is an active master of the teleoperation session.

In an embodiment of the present disclosure, at step 316, the active master and the robot that is now the avatar of the active master notifies the signaling server that the P2P connection is established, and the signaling server in turn notifies the same to the broadcaster. The broadcaster then broadcasts (i) the current state of the robot being state_2 and (ii) ID of the active master in P2P connection with the robot, to remaining masters amongst the plurality of masters, at step 318.

In an embodiment of the present disclosure, the broadcaster rejects the P2P connection request, from the master, via the signaling server, if the current state of the robot is state_0 or state_2.

The federated control of the robot (avatar) by the plurality of masters is demonstrated in the description hereinafter. In an embodiment of the present disclosure, the active master sends a P2P disconnection request, to the broadcaster via the signaling server; the broadcaster then notifies the avatar of the P2P disconnection request, via the signaling server; and the broadcaster broadcasts the current state of the robot being state_1, via the signaling server to the active master that has relinquished control and the remaining masters amongst the plurality of masters. Thus, only after the broadcaster marks the avatar as free, does one of masters from the remaining masters send a P2P connection request to the robot for taking control, thereby demonstrating a cooperation rather than a competition between the masters in controlling the robot (avatar).

Figure 5A:
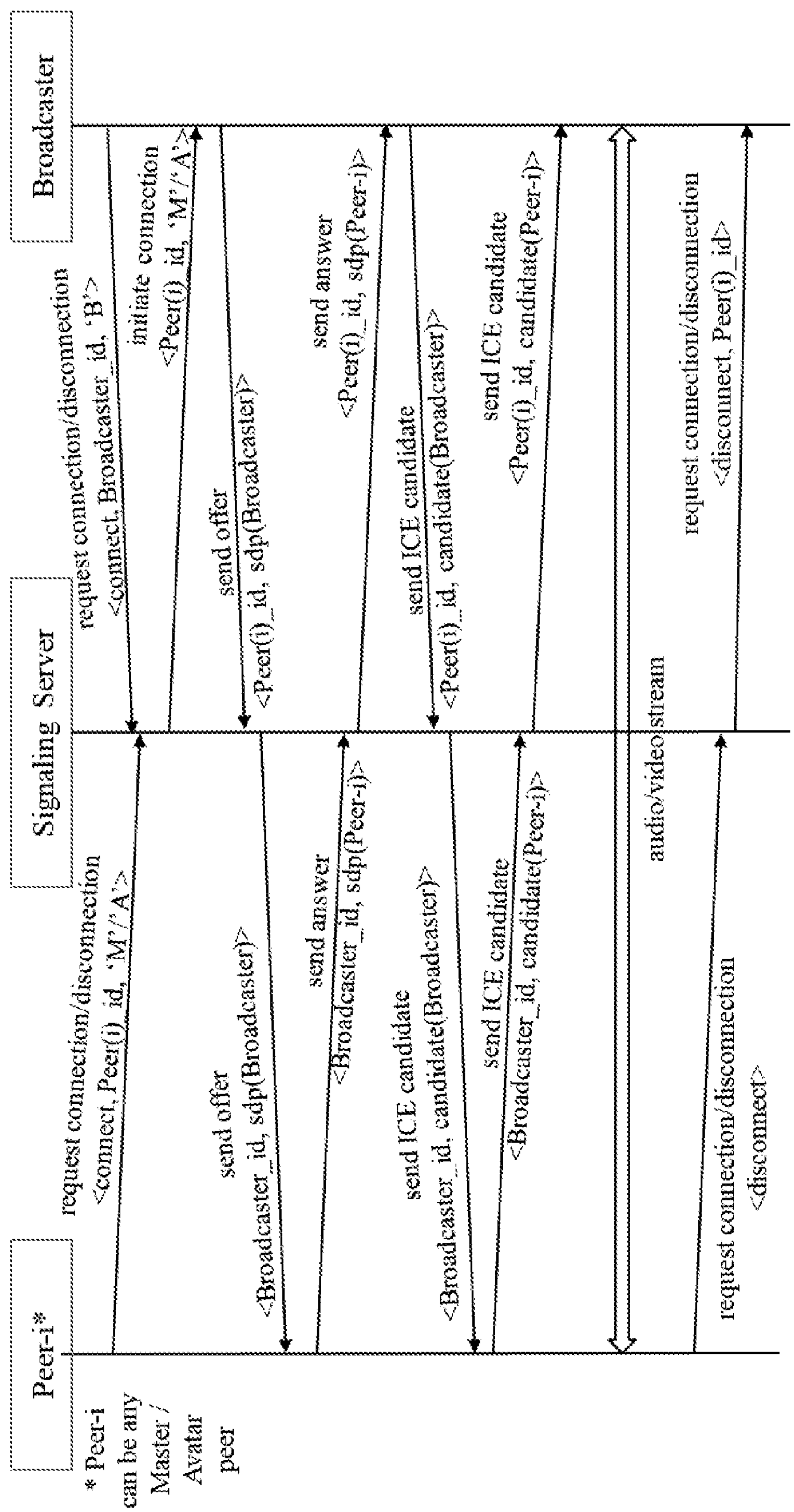
FIG. 5A illustrates a flow diagram for establishing connection and disconnecting a broadcasting session, in accordance with some embodiments of the present disclosure.
Figure 5B:
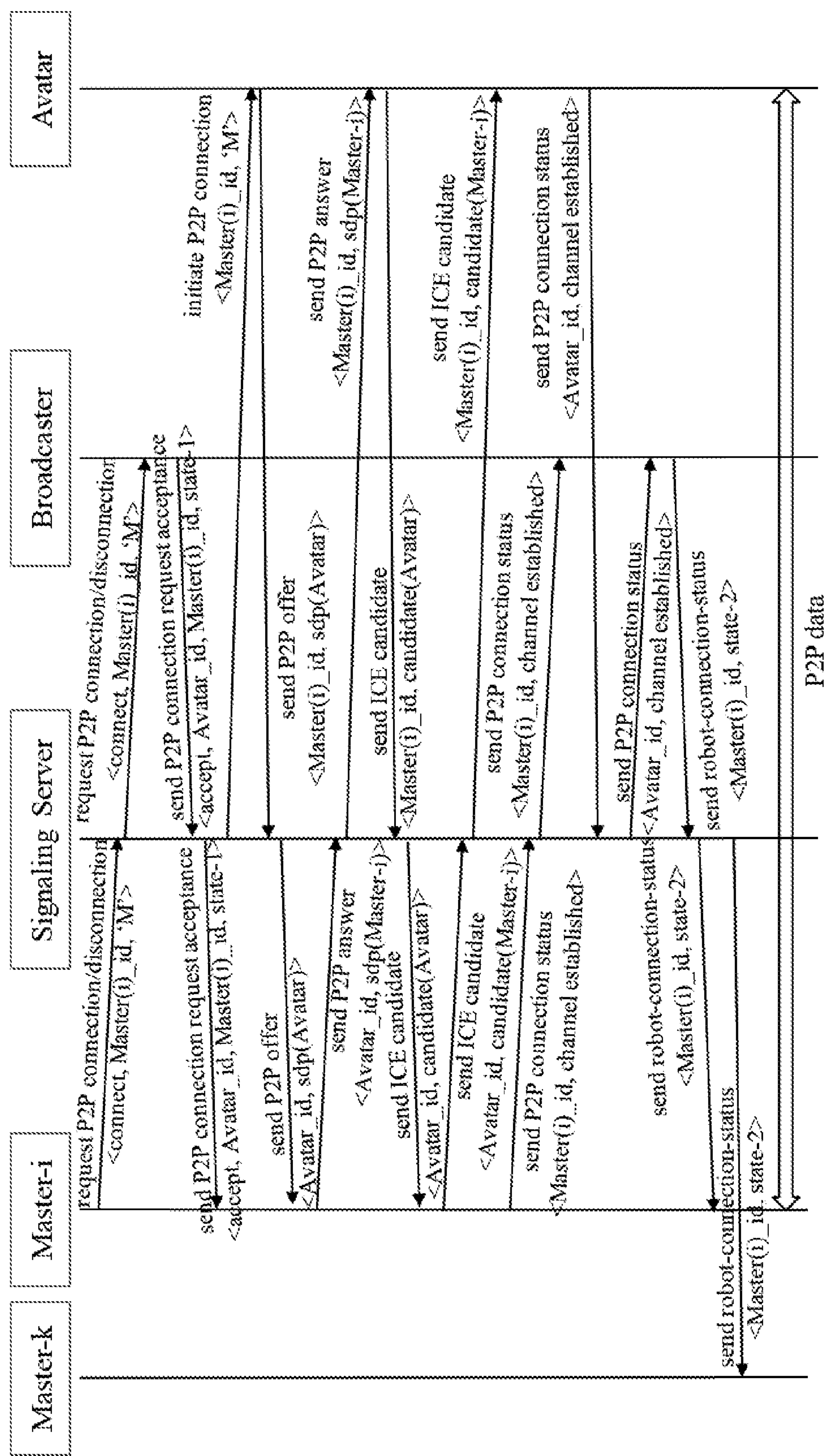
FIG. 5B illustrates a flow diagram for establishing a peer-to-peer (P2P) connection between a master and a robot when the current state of the robot is state_1, in accordance with some embodiments of the present disclosure.
Figure 5C:
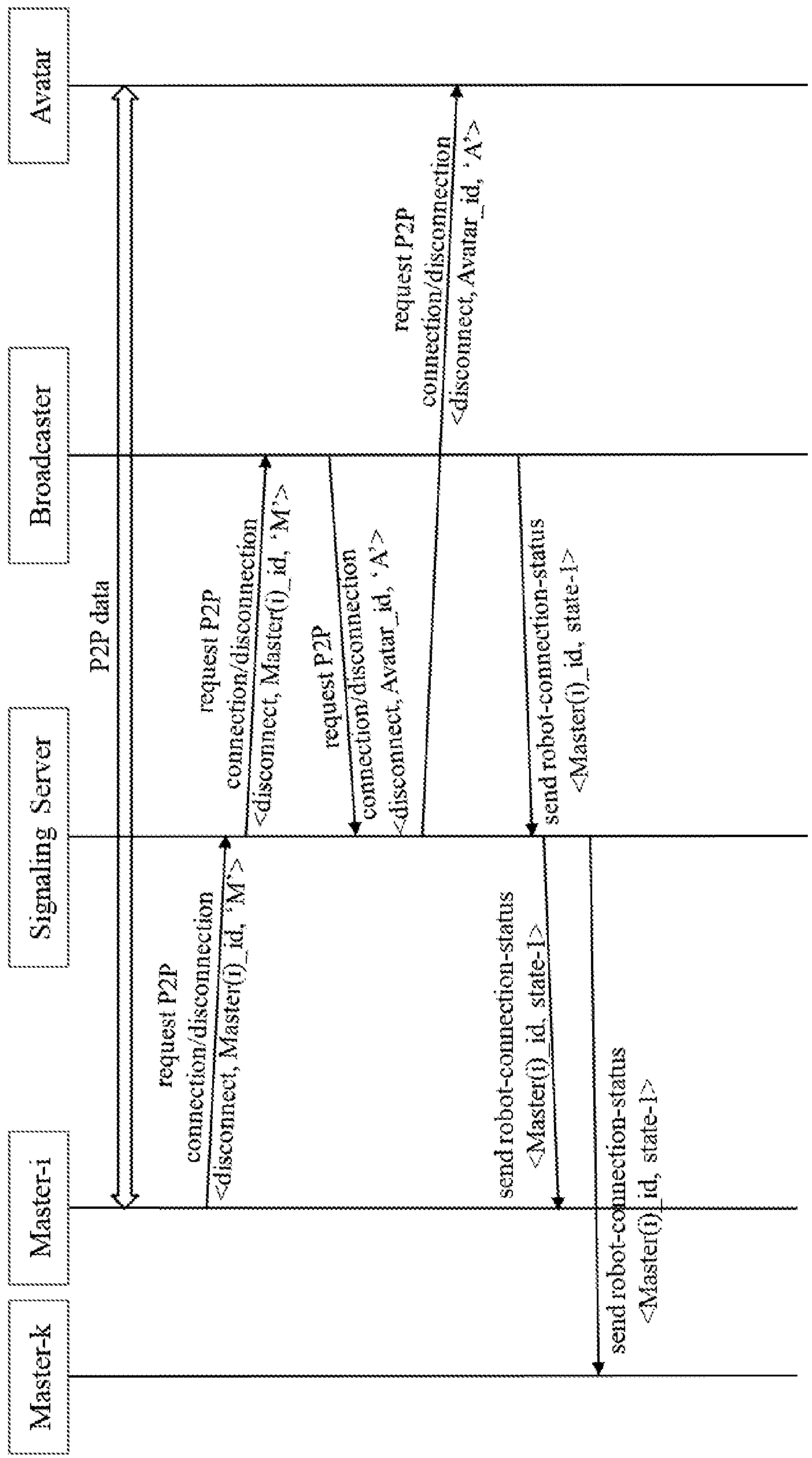
FIG. 5C illustrates a flow diagram for disconnecting the P2P connection between the master and the robot when the current state of the robot is state_2, in accordance with some embodiments of the present disclosure.
Figure 5D:
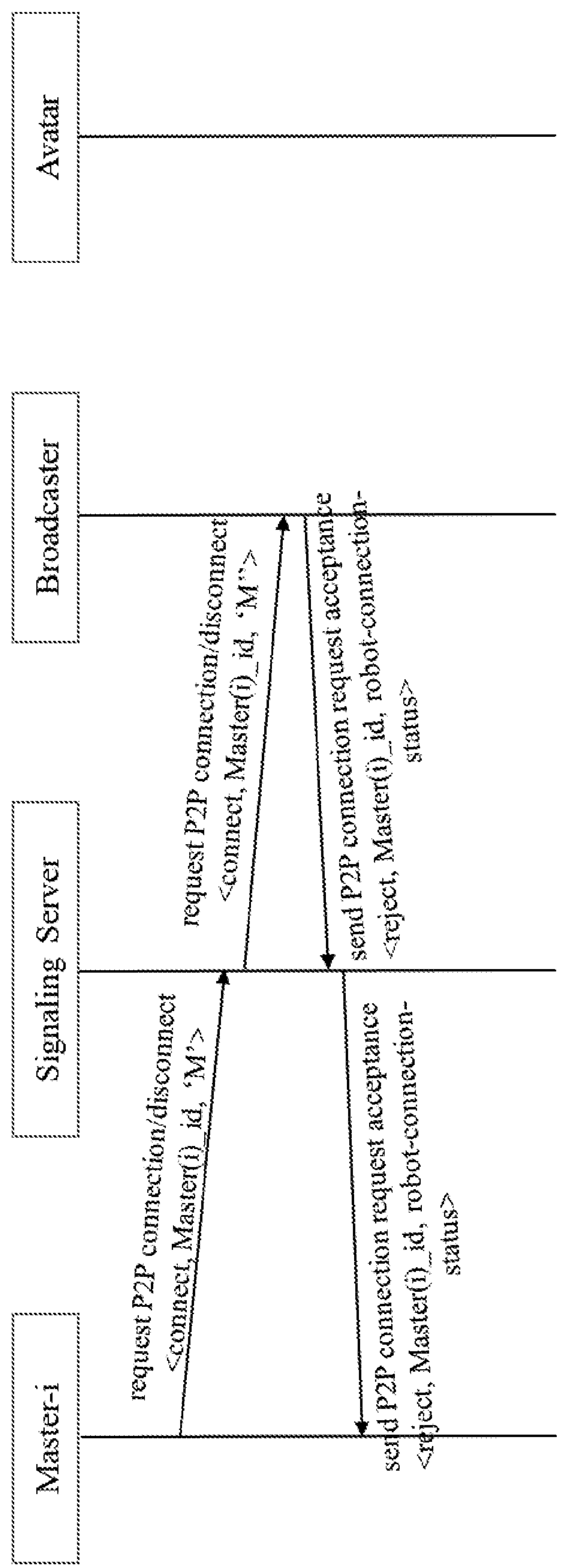
FIG. 5D illustrates a flow diagram for establishing the P2P connection between the master and the robot when the current state of the robot is state_0 or state_1, in accordance with some embodiments of the present disclosure.

The above steps of interaction are further illustrated in FIG. 5A through FIG. 5D wherein flow diagrams for the messaging between the plurality of peers is demonstrated. FIG. 5A illustrates a flow diagram for establishing connection and disconnecting a broadcasting session, FIG. 5B illustrates a flow diagram for establishing a peer-to-peer (P2P) connection between a master and a robot when the current state of the robot is state_1, FIG. 5C illustrates a flow diagram for disconnecting the P2P connection between the master and the robot when the current state of the robot is state_2, and FIG. 5D illustrates a flow diagram for establishing the P2P connection between the master and the robot when the current state of the robot is state_0 or state_1, in accordance with some embodiments of the present disclosure.

In an embodiment of the present disclosure, the step of establishing the P2P connection is via the TURN server based on whether the active master and the avatar are behind a restrictive NAT. This has been further validated for efficacy through the experimental analysis provided later in the description. FIG. 6A and FIG. 6B illustrate the WebRTC with direct P2P connection and the WebRTC with P2P via the TURN server respectively, in accordance with some embodiments of the present disclosure.

In an embodiment of the present disclosure, at step 328, streaming of the Audio-Visual (A/V) data amongst the plurality of peers may continue via the public cloud in the star topology, while control commands are delivered with low latency between the active master and the avatar via the established P2P connection on-demand, thereby providing a hybrid topology.

In accordance with the present disclosure, the plurality of peers interacts between each other via messaging. In an embodiment, the messaging is in a JavaScript Object Notation (JSON) format with four parameters represented as:

```
{
  "connection-type": <>,
  "room-id": <>,
  "message-type": <>,
  "message": <>
}
```

In an embodiment, the four parameters of the messaging are characterized as:

(i) the "connection-type" is a Boolean, wherein 0 indicates a broadcast session and 1 indicates the P2P connection;

(ii) the "room-id" is a string value representing an identifier (ID) for the teleoperation session; (iii) the "message-type" is a three-bit string, wherein 000 represents request connection or disconnection,
001 represents send connection request acceptance,
010 represents initiate connection,
011 represents send connection establishment status,
100 represents send robot-connection-status,
101 represents send offer,
110 represents send answer, and
111 represents send ICE candidate; and (iv) the "message" comprises messages specific to the "message-type" in the JSON format.

Figure 7A:
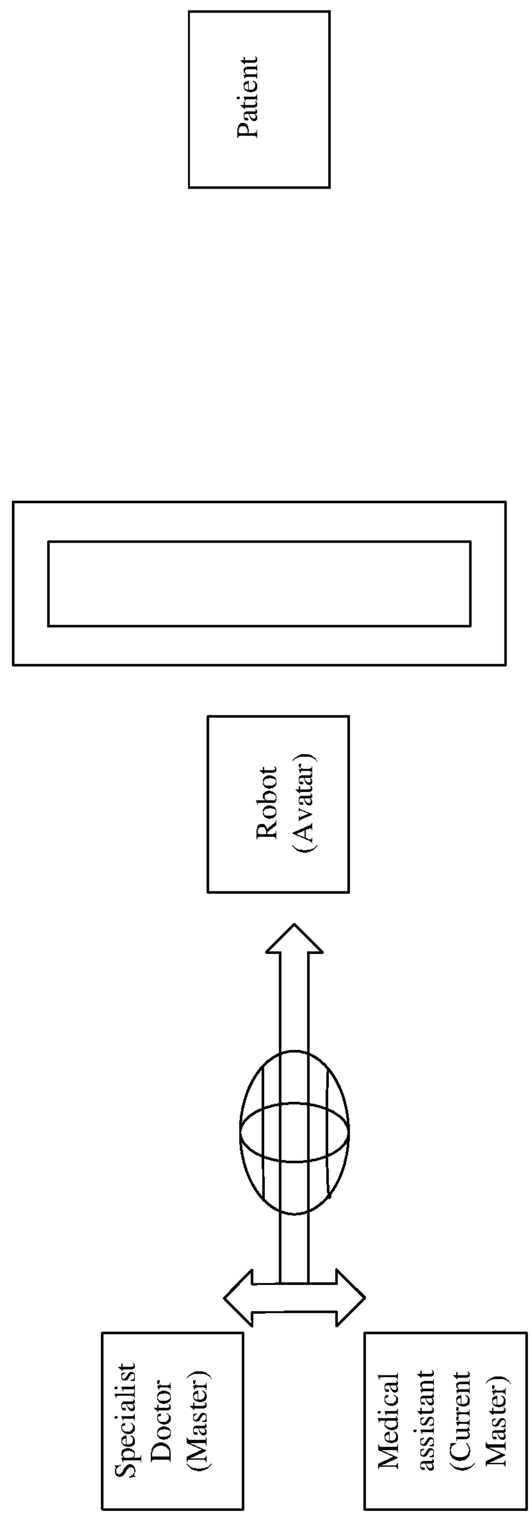

FIG. 7A and FIG. 7B illustrate a practical telemedicine application of the telerobotics system of FIG. 1 and the computer implemented method of FIG. 3A through FIG. 3C, wherein medical staff collaborate with a robot to provide consultation to a patient, in accordance with some embodiments of the present disclosure. In the illustrated application, a medical assistant and a specialist doctor may join a telerobotics session with a robot from two distant locations to provide consultation to the patient in an isolation ward. In the beginning of the telerobotics session, the medical assistant, who is aware of the geography of the patient's premise, remotely maneuvers the robot to navigate near the patient (FIG. 7A). After this, she relinquishes control and the specialist doctor takes control and becomes the current master to pursue further interactions with the patient (FIG. 7B). The medical assistant meanwhile continues in the A/V conference to follow the specialist doctor's instructions. EXPERIMENTAL ANALYSIS.

Deployment and Test-bed: A custom built WebRTC stack was created using the standard WebRTC APIs using Java Script and HTML 5. The signaling server was run on node.js. The nodes acting as Master/Avatar used Google Chrome™ or Mozilla™ browsers for the user interface. The broadcaster used a headless Chrome™ implementation called puppeteer. The media-manager within the broadcaster was built using the video stream merger APIs from Node Package Manager (NPM) registry. The avatar was an Intel™ Core i5 laptop running Ubuntu™ 16.04. The avatar laptop was fixed on a custom-built robotic base created using "Arduino Uno R3" microcontroller. The microcontroller was connected to the laptop through a USB port. The microcontroller was augmented with L293D motor driver shield, 4 gear motors running 4 wheels in front, rear, left and right directions. The system was powered by a 2200 mAh battery. The avatar machine was installed with Python™ 3.9. The interfacing between the controller and the avatar machine was done through serial port using PySerial library APIs. All commands were passed through this. The connection between the avatar browser and the Python™ module was done through a WebSocket within the scope of the local host. The browser code ran a WebSocket client which connected to local Python™ WebSocket server on the Avatar laptop. The WebSocket server housed the PySerial APIs. Thus, all the control commands received by the avatar browser were transferred to the microcontroller through the WebSocket connection. This way an $i^{th}$ master could use the browser UI to remotely maneuver the avatar. The broadcaster and the signaling servers were hosted in an Amazon Web Services (AWS) cloud on two Elastic Compute Cloud (EC2) t3.xlarge instances. The TURN server was built using COTURN on one of the instances. The cloud instances were located in the US-EAST region. Three masters and the robot (avatar) joined from different locations around the city of Kolkata, India and the distance between the robot and the masters ranged between 50 and 100 km.

Analysis on network aspects: The latency performance in terms of the closed loop response time was first compared as a Round-trip time (RTT), wherein RTT=t2−t1, t1 being time recorded at the master browser when a command button is pressed and t2 being time recorded when an acknowledgement is received at the master browser.

Figure 8:
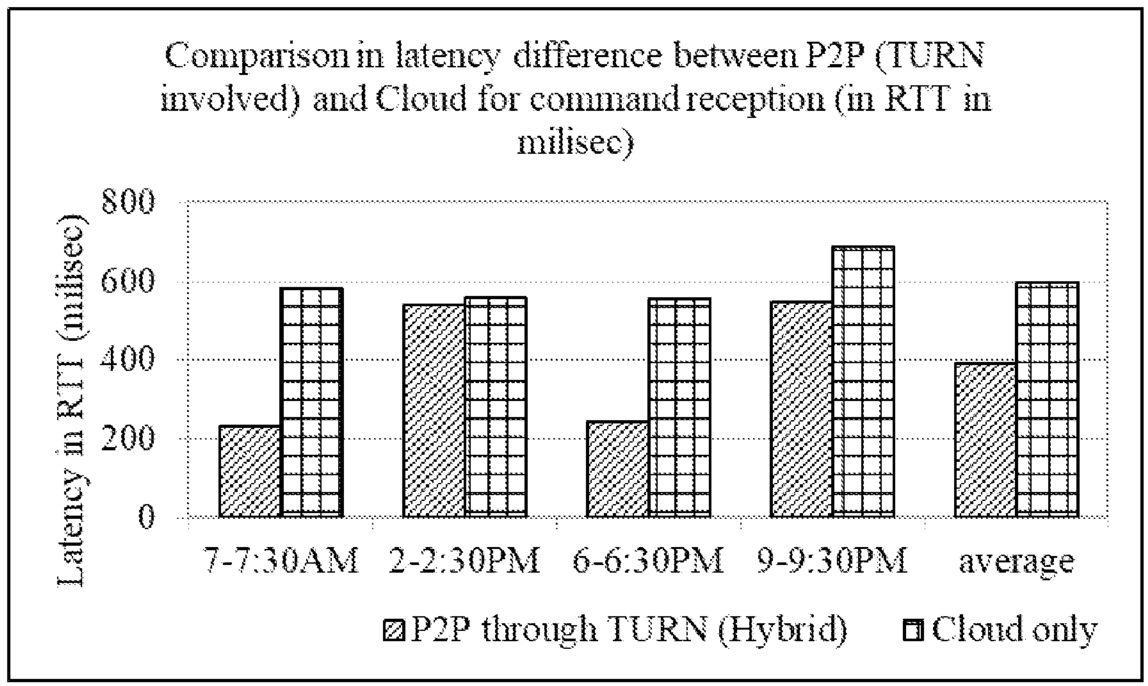
FIG. 8 illustrates a Round-trip time (RTT) comparison between cloud only and hybrid configuration of the multi-master telerobotics system of FIG. 1 when the P2P command control channel passes through the TURN server, in accordance with some embodiments of the present disclosure.

The Java Script is modified to report the RTT on the master browser after every command. The values for 3 different users from three different locations as specified above at four different segments of the day was noted. The segments were morning (7-7:30 am), afternoon (2-2:30 pm), evening (6-6:30 pm), night (9-9:30 pm). A five-day average of the RTT for all the users for each segment of the day and the overall average is shown for both cloud-only configuration and the hybrid configuration is studied. FIG. 8 illustrates the RTT comparison between cloud only and hybrid configuration of the telerobotics system of FIG. 1 when the P2P command control channel passes through the TURN server, in accordance with some embodiments of the present disclosure.

The avatar was connected to an Internet service provider (ISP) via WiFi Access Points (AP) such that the ISP forces server reflexive address for all nodes connected to it. Thus, all the WebRTC peering are over the TURN server. It was observed that in India most of WiFi service provider ISPs force the use of NAT. From the result, it was seen that in the hybrid mode the command response was received much faster that the cloud-only mode. This is because, in hybrid mode, the control commands pass through the P2P channel, rather than through the broadcaster cloud. Although it passes through the TURN relay, still a reduction in the order of several hundreds of milliseconds was noted.

Figure 9:
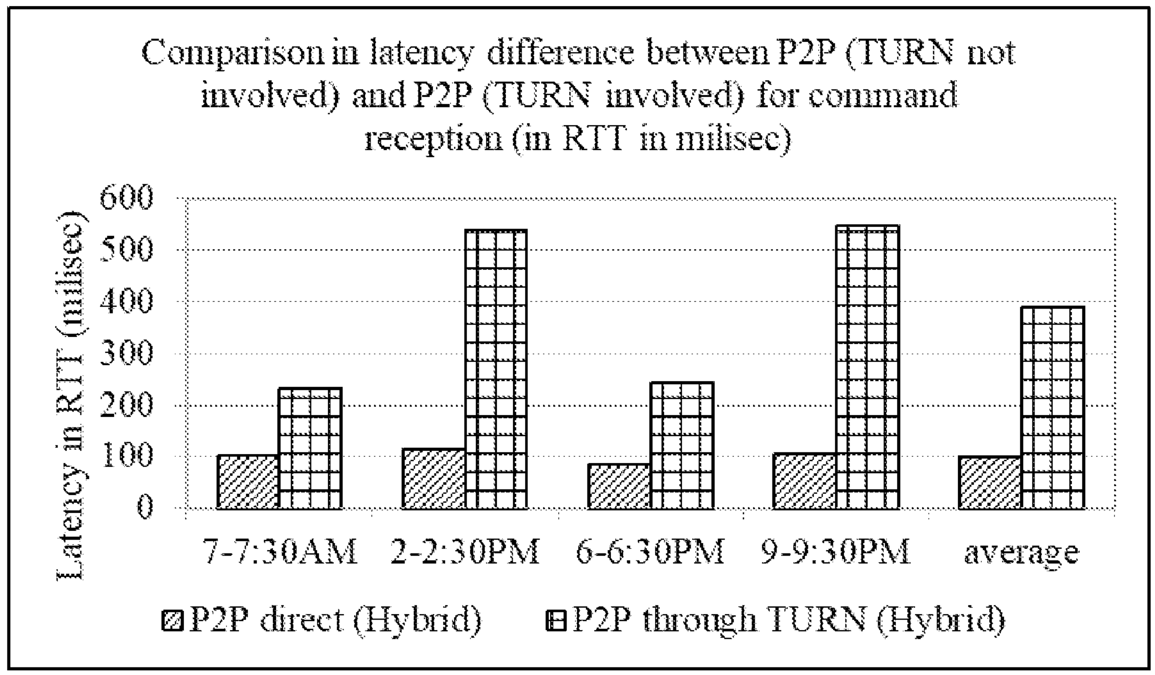
FIG. 9 illustrates a Round-trip time (RTT) comparison between two different types of P2P command control channels for the same hybrid configuration of the multi-master telerobotics system of FIG. 1, wherein one of the P2P command control channels passes through the TURN server and the other is direct, in accordance with some embodiments of the present disclosure.

The above experiment was repeated with all users and the avatar connecting using 4G subscriber identity module (SIM) from smartphones, rather than WiFi APs. In this case TURN relay was not required. The command response for hybrid-mode was compared with the situation where P2P was established through TURN server. The result is shown in FIG. 9. FIG. 9 illustrates a Round-trip time (RTT) comparison between two different types of P2P command control channels for the same hybrid configuration of the telerobotics system of FIG. 1, wherein one of the P2P command control channels passes through the TURN server and the other is direct, in accordance with some embodiments of the present disclosure. It was observed that there is a further reduction by hundreds of milliseconds in the latency when the TURN relay is not used. One of the reasons of such a huge reduction is that the TURN server's location is in US, while the P2P connection is established within India. It was also seen that in the peak hours the difference in RTT for the two configurations minimizes. This is also due to the load in the long backhaul during the peak usage in India and US respectively. Relocating the TURN server in India might have reduced the delay in TURN. Also, the effect of time axis is not significant for direct P2P connection. Hence, the results strongly establish the efficacy of hybrid telerobotics system of the present disclosure.

Figure 10:
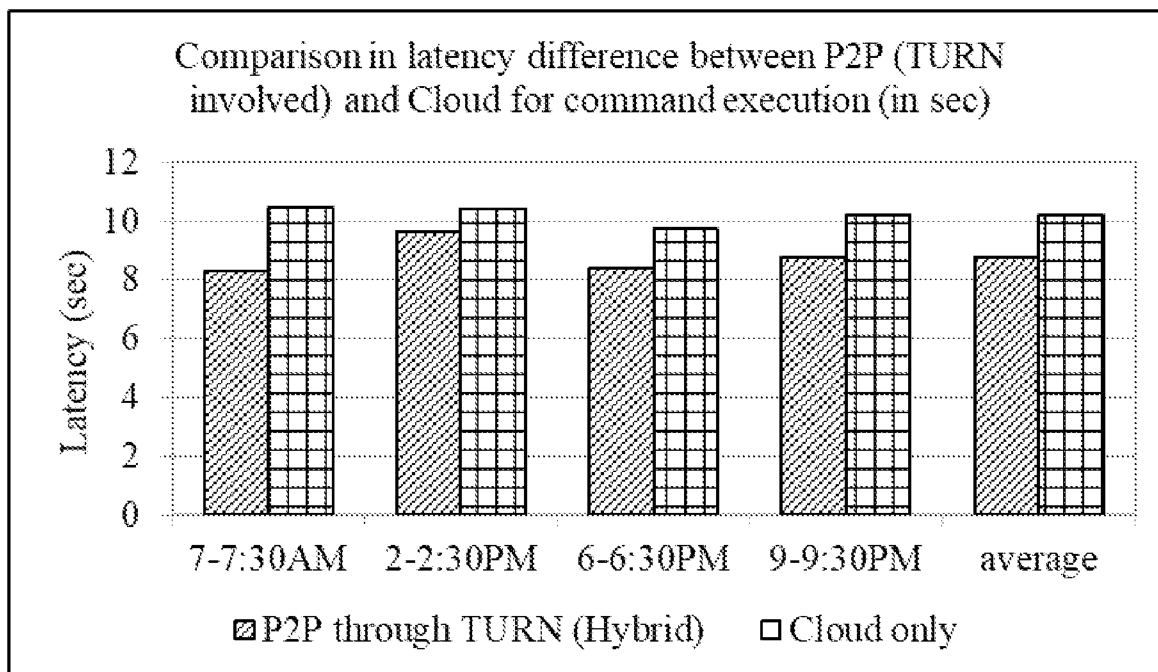
FIG. 10 illustrates results obtained from an experimental setup to observe visual feedback from an avatar, as average in time buckets and the overall average for the hybrid configuration, in accordance with some embodiments of the present disclosure.

Analysis on visual aspects: For application users, paramount importance for QoE is when the user sees the desired visual feedback from the avatar after pressing a command button. To accomplish this, a set up was created. A blue bottle was placed in camera-front at the original position of the avatar and a red bottle was placed at a perpendicular position such that the avatar faces this bottle when it rotates left by ninety degrees. The test-bed described above was used and similar exercise as described above was repeated. However, every master pressed only the L (rotate left) button. A time calculation tool was developed for this by enhancing Java Script code running at the master browser. Whenever the user pressed L, a timer started on the browser. As soon as the master saw the complete view of the red bottle on the console, he/she pressed a stop button and the timer stopped. This is referred to as Response time defined as:Execution time=t2−t1, wherein a represents time recorded at the master browser when L command button was pressed and t2 represents time recorded when the master presses the stop button. FIG. 10 illustrates results obtained from an experimental setup to observe visual feedback from an avatar, as average in time buckets and the overall average for the hybrid configuration, in accordance with some embodiments of the present disclosure. A faster average response was seen for the hybrid configuration. This is because the execution starts much earlier in case of hybrid configuration since the desired command is communicated to the avatar much faster due to the P2P between the master and the avatar.

Summarizing, the present disclosure provides a multi-master hybrid telerobotics system with federated avatar control and custom messaging built using WebRTC Application Programming Interfaces (APIs). The star topology/cloud based system allows multiple human users to join a teleoperation session along with the robot. While the users may continue A/V conferencing through a cloud infrastructure, any one of the human users may acquire exclusive control on the robot and make it his/her avatar. The commands to control the avatar no longer travel through the cloud, rather, in the interest of reduced latency in remote execution, they are transmitted over an on demand P2P channel created between the active master and the avatar. The practical on-field deployment of the architecture has proven to have better performance compared to cloud centric architecture.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:

sending a peer-to-peer (P2P) connection request, from a master amongst a plurality of masters being user devices associated with a corresponding user, to a broadcaster via a signaling server, wherein the signaling server and the broadcaster are hosted on a public cloud and wherein the broadcaster is connected to a plurality of peers including (i) the plurality of masters and (ii) a robot in a star topology, each peer being identified by an associated peer-type and interact with each other via messaging;

notifying (i) an identifier (ID) associated with the robot and the master, and (ii) a current state of the robot, by the broadcaster to the signaling server, wherein the broadcaster comprises a state-register for maintaining the current state of the robot and a media-manager for combining an Audio-Visual (A/V) data received from the plurality of peers via the public cloud;

responding, by the broadcaster via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master;

if the current state of the robot is state_1, performing in parallel, by the signaling server, the steps of:

passing the ID associated with the robot and the current state of the robot received from the broadcaster to the master; and requesting the robot to initiate a P2P connection with the master associated with the ID received from the broadcaster;

sending, by the robot, a P2P connection offer to the master associated with the ID received, via the signaling server;

accepting the P2P connection offer, by the master via the signaling server;

establishing the P2P connection, on-demand between the master and the robot, upon exchanging of an Interactive Connectivity Establishment (ICE) candidate therebetween via the signaling server, wherein the robot represents an avatar of the master configured to control the robot via the P2P connection in a federated manner and the master is an active master of the teleoperation session;

notifying that the P2P connection is established, by the active master and the robot to the signaling server and by the signaling server to the broadcaster; and broadcasting (i) the current state of the robot being state_2 and (ii) ID of the active master in P2P connection with the robot, to remaining masters amongst the plurality of masters, by the broadcaster, wherein, one or more hardware processors serve as the plurality of masters, the broadcaster, the signaling server and the robot.

2. The processor implemented method of claim 1, wherein the step of establishing the P2P connection is via a Traversal Using Relays around NAT (TURN) server based on whether the active master and the avatar are behind a restrictive Network Address Translators (NAT).

3. The processor implemented method of claim 1, further comprising rejecting the P2P connection request, from the master, by the broadcaster via the signaling server, if the current state of the robot is state_0 or state_2.

4. The processor implemented method of claim 1, further comprising:

sending a P2P disconnection request, from the active master, to the broadcaster via the signaling server;

notifying the avatar of the P2P disconnection request, by the broadcaster via the signaling server; and broadcasting the current state of the robot being state_1, by the broadcaster via the signaling server to the active master that has relinquished control and the remaining masters amongst the plurality of masters.

5. The processor implemented method of claim 1, further comprising streaming of the Audio-Visual (A/V) data amongst the plurality of peers via the public cloud in the star topology, while control commands are delivered with low latency between the active master and the avatar via the established P2P connection on-demand, thereby providing a hybrid topology.

6. The processor implemented method of claim 1, wherein the messaging between the plurality of peers is in a JavaScript Object Notation (JSON) format with four parameters represented as:

```
{
  "connection-type": <>,
  "room-id": <>,
```

-continued

```
  "message-type": <>,
  "message": <>
}.
```

7. The processor implemented method of claim 6, wherein the four parameters are characterized as:

(i) the "connection-type" is a Boolean, wherein 0 indicates a broadcast session and 1 indicates the P2P connection;

(ii) the "room-id" is a string value representing an identifier (ID) for the teleoperation session;

(iii) the "message-type" is a three-bit string, wherein
000 represents request connection or disconnection,
001 represents send connection request acceptance,
010 represents initiate connection,
011 represents send connection establishment status,
100 represents send robot-connection-status,
101 represents send offer,
110 represents send answer, and
111 represents send ICE candidate; and (iv) the "message" comprises messages specific to the "message-type".

8. A telerobotics system comprising:

a memory storing instructions;

one or more communication interfaces; and one or more hardware processors coupled to the memory via the one or more communication interfaces, wherein the one or more hardware processors serving as a plurality of masters being user devices associated with a corresponding user, a broadcaster, a signaling server, and a robot are configured by the instructions to:

send a peer-to-peer (P2P) connection request, from a master amongst the plurality of masters, to the broadcaster via the signaling server, wherein the signaling server and the broadcaster are hosted on a public cloud and wherein the broadcaster is connected to a plurality of peers including (i) the plurality of masters and (ii) the robot in a star topology, each peer being identified by an associated peer-type;

notify (i) an identifier (ID) associated with the robot and the master, and (ii) a current state of the robot, by the broadcaster to the signaling server, wherein the broadcaster comprises a state-register for maintaining the current state of the robot and a media-manager for combining an Audio-Visual (A/V) data received from the plurality of peers via the public cloud;

respond, by the broadcaster via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master;

if the current state of the robot is state_1, perform in parallel, by the signaling server, the steps of:

passing the ID associated with the robot and the current state of the robot received from the broadcaster to the master; and requesting the robot to initiate a P2P connection with the master associated with the ID received from the broadcaster;

send, by the robot, a P2P connection offer to the master associated with the ID received, via the signaling server;

accept the P2P connection offer, by the master via the signaling server;

establish the P2P connection, on-demand between the master and the robot, upon exchanging of an Interactive Connectivity Establishment (ICE) candidate therebetween via the signaling server, wherein the robot represents an avatar of the master configured to control the robot via the P2P connection in a federated manner and the master is an active master of the teleoperation session;

notify that the P2P connection is established, by the active master and the robot to the signaling server and by the signaling server to the broadcaster; and broadcast (i) the current state of the robot being state_2 and (ii) ID of the active master in P2P connection with the robot, to remaining masters amongst the plurality of masters, by the broadcaster.

9. The telerobotics system of claim 8, wherein the one or more processors are further configured to establish the P2P connection via a Traversal Using Relays around NAT (TURN) server based on whether the active master and the avatar are behind a restrictive Network Address Translators (NAT).

10. The telerobotics system of claim 8, wherein the one or more processors serving as the broadcaster are further configured to reject the P2P connection request, from the master, via the signaling server, if the current state of the robot is state_0 or state_2.

11. The telerobotics system of claim 8, wherein the one or more processors are further configured to:

send a P2P disconnection request, from the active master, to the broadcaster via the signaling server;

notify the avatar of the P2P disconnection request, by the broadcaster via the signaling server; and broadcast the current state of the robot being state_1, by the broadcaster via the signaling server to the active master that has relinquished control and the remaining masters amongst the plurality of masters.

12. The telerobotics system of claim 8, wherein the one or more processors are further configured to stream the Audio-Visual (A/V) data amongst the plurality of peers via the public cloud in the star topology, while control commands are delivered with low latency between the active master and the avatar via the established P2P connection on-demand, thereby providing a hybrid topology.

13. The telerobotics system of claim 8, wherein the messaging between the plurality of peers is in a JavaScript Object Notation (JSON) format with four parameters represented as:

```
{
  "connection-type": <>,
  "room-id": <>,
  "message-type": <>,
  "message": <>
}.
```

14. The telerobotics system of claim 13, wherein the four parameters are characterized as:

(i) the "connection-type" is a Boolean, wherein 0 indicates a broadcast session and 1 indicates the P2P connection;

(ii) the "room-id" is a string value representing an identifier (ID) for the teleoperation session;

(iii) the "message-type" is a three-bit string, wherein
000 represents request connection or disconnection,
001 represents send connection request acceptance,
010 represents initiate connection,
011 represents send connection establishment status,
100 represents send robot-connection-status,
101 represents send offer,
110 represents send answer, and
111 represents send ICE candidate; and (iv) the "message" comprises messages specific to the "message-type".

15. One or more non-transitory machine-readable information storage mediums comprising one or more instructions which when executed by one or more hardware processors cause:

sending a peer-to-peer (P2P) connection request, from a master amongst a plurality of masters being user devices associated with a corresponding user, to a broadcaster via a signaling server, wherein the signaling server and the broadcaster are hosted on a public cloud and wherein the broadcaster is connected to a plurality of peers including (i) the plurality of masters and (ii) a robot in a star topology, each peer being identified by an associated peer-type and interact with each other via messaging;

notifying (i) an identifier (ID) associated with the robot and the master, and (ii) a current state of the robot, by the broadcaster to the signaling server, wherein the broadcaster comprises a state-register for maintaining the current state of the robot and a media-manager for combining an Audio-Visual (A/V) data received from the plurality of peers via the public cloud;

responding, by the broadcaster via the signaling server, to the P2P connection request based on the current state of the robot, wherein the current state of the robot is set by the state-register of the broadcaster as one of (i) state_0 indicative of the robot not having joined a teleoperation session, (ii) state_1 indicative of the robot having joined the teleoperation session but not connected with the master using the P2P connection, and (iii) state_2 indicative of the robot being connected to the master;

if the current state of the robot is state_1, performing in parallel, by the signaling server, the steps of:

passing the ID associated with the robot and the current state of the robot received from the broadcaster to the master; and requesting the robot to initiate a P2P connection with the master associated with the ID received from the broadcaster;

sending, by the robot, a P2P connection offer to the master associated with the ID received, via the signaling server;

accepting the P2P connection offer, by the master via the signaling server;

establishing the P2P connection, on-demand between the master and the robot, upon exchanging of an Interactive Connectivity Establishment (ICE) candidate therebetween via the signaling server, wherein the robot represents an avatar of the master configured to control the robot via the P2P connection in a federated manner and the master is an active master of the teleoperation session;

notifying that the P2P connection is established, by the active master and the robot to the signaling server and by the signaling server to the broadcaster; and broadcasting (i) the current state of the robot being state_2 and (ii) ID of the active master in P2P connection with the robot, to remaining masters amongst the plurality of masters, by the broadcaster, wherein, the one or more hardware processors serve as the plurality of masters, the broadcaster, the signaling server and the robot.

16. The one or more non-transitory machine-readable information storage mediums of claim 15, wherein the one or more instructions which when executed by the one or more hardware processors further cause one or more of:

establishing the P2P connection is via a Traversal Using Relays around NAT (TURN) server based on whether the active master and the avatar are behind a restrictive Network Address Translators (NAT);

rejecting the P2P connection request, from the master, by the broadcaster via the signaling server, if the current state of the robot is state_0 or state_2;

sending a P2P disconnection request, from the active master, to the broadcaster via the signaling server;

notifying the avatar of the P2P disconnection request, by the broadcaster via the signaling server;

broadcasting the current state of the robot being state_1, by the broadcaster via the signaling server to the active master that has relinquished control and the remaining masters amongst the plurality of masters; and streaming of the Audio-Visual (A/V) data amongst the plurality of peers via the public cloud in the star topology, while control commands are delivered with low latency between the active master and the avatar via the established P2P connection on-demand, thereby providing a hybrid topology.

17. The one or more non-transitory machine-readable information storage mediums of claim 15, wherein the messaging between the plurality of peers is in a JavaScript Object Notation (JSON) format with four parameters represented as:

```
{
  “connection-type”: <>
  “room-id”: <>,
  “message-type”: <>,
  “message”: <>
}.
```

18. The one or more non-transitory machine-readable information storage mediums of claim 17, wherein the four parameters are characterized as:

(i) the “connection-type” is a Boolean, wherein 0 indicates a broadcast session and 1 indicates the P2P connection;

(ii) the “room-id” is a string value representing an identifier (ID) for the teleoperation session;

(iii) the “message-type” is a three-bit string, wherein
000 represents request connection or disconnection,
001 represents send connection request acceptance,
010 represents initiate connection,
011 represents send connection establishment status,
100 represents send robot-connection-status,
101 represents send offer,
110 represents send answer, and
111 represents send ICE candidate; and (iv) the “message” comprises messages specific to the “message-type”.

* * * * *